US006866515B2

(12) United States Patent
Garnett

(10) Patent No.: US 6,866,515 B2
(45) Date of Patent: Mar. 15, 2005

(54) METHOD FOR PROVIDING BUSINESS CONDUCT TRAINING

(75) Inventor: Timothy A. Garnett, Chesterfield, MO (US)

(73) Assignee: Bryan Cave LLP, St. Louis, MO (US)

( * ) Notice: Subject to any disclaimer, the term of this patent is extended or adjusted under 35 U.S.C. 154(b) by 0 days.

(21) Appl. No.: 09/798,299

(22) Filed: Mar. 2, 2001

(65) Prior Publication Data

US 2002/0123027 A1 Sep. 5, 2002

(51) Int. Cl.$^7$ .............................................. G09B 3/00
(52) U.S. Cl. ....................... 434/322; 434/350; 434/236; 434/219; 434/118
(58) Field of Search ................................. 434/322, 236, 434/238, 350, 118

(56) References Cited

U.S. PATENT DOCUMENTS

| | | | | |
|---|---|---|---|---|
| 5,395,243 A | * | 3/1995 | Lubin et al. ................. | 434/118 |
| 5,489,213 A | | 2/1996 | Makipaa | |
| 5,743,743 A | * | 4/1998 | Ho et al. ..................... | 434/236 |
| 5,820,386 A | * | 10/1998 | Sheppard, II ............... | 434/322 |
| 5,907,831 A | * | 5/1999 | Lotvin et al. ................. | 705/14 |
| 5,934,909 A | * | 8/1999 | Ho et al. ..................... | 434/362 |
| 6,099,320 A | * | 8/2000 | Papadopoulos ............. | 434/322 |
| 6,146,148 A | * | 11/2000 | Stuppy ........................ | 434/322 |
| 6,149,438 A | * | 11/2000 | Richard et al. ............. | 434/322 |
| 6,149,441 A | * | 11/2000 | Pellegrino et al. .......... | 434/350 |
| 6,296,487 B1 | * | 10/2001 | Lotecka ....................... | 434/118 |
| 6,370,355 B1 | * | 4/2002 | Ceretta et al. .............. | 434/350 |
| 6,427,063 B1 | * | 7/2002 | Cook et al. .................. | 434/350 |
| 6,438,353 B1 | * | 8/2002 | Casey-Cholakis et al. .. | 434/350 |
| 2002/0019741 A1 | | 2/2002 | Heston | |

OTHER PUBLICATIONS

Ivy, Diana K; Hamlet, Stephen. College Students and Sexual Dynamics. Apr., 1996. Communication Education, v45 n2, p149–166.*
"Desktop Legal Advice Comes to Workers via a New Online Service", Wall Street Journal, Dec. 16, 1999.
"Littler Mendelson, Law Firm to Business, Breaking the Mold", Leslie A. Gordon, Aug. 2000.
"Web–Based Training Helps Prevent Illegal Workplace Harassment", Legal Management, Mar./ Apr. 2000.
"Jackson Lewis and HR Company Form Compliance Partnership", Preventative Strategies, Fall 2000.
"Firms Keep Workers in the Know with Computerized Internet Courses", Julie Mitchell, Unknown.
"Compliance Tools for Human Resource Professionals", HR Comply, Unknown.

(List continued on next page.)

Primary Examiner—Xuan M. Thai
Assistant Examiner—Cameron Saadat
(74) Attorney, Agent, or Firm—Bryan Cave, LLP

(57) ABSTRACT

The present invention relates to a computer-implemented method for providing business conduct training. The trainee is identified using an identifier input by the trainee. A training course including training information relating to business conduct is displayed to the trainee. As the trainee progresses through the course, the trainee is provided access to an information center module comprising materials for reinforcing the training information displayed in the training course. A practical scenario is illustrated to the trainee. The scenario has associated training questions and training answer choices requiring application of the training information provided in the training course. The trainee selects one or more training answer selections from the training answer choices and receives feedback on the answers given.

20 Claims, 15 Drawing Sheets

OTHER PUBLICATIONS

"103–Sexual Harrassment—Recognizing & Preventing—Manager's Edition", www./train/TrainHist.asp (2 pages), Nov. 30, 1999.

"Sexual Harrasment: What HR Professionals Need to Know", www.hrtrain.com (9 pages), Oct. 5, 1999.

"How to Prevent Sexual Harrassment & Hostile Work Environments", www.stepbeyond.com (25 pages), Nov. 12–13, 1999.

"HR Compliance Demonstration Course", www.hrcompliance.com (8 pages), Nov. 13, 1999.

"Guidebook for What Everyone Needs to Know about Sexual Harassment: The Video", www.hrtrain.com (16 pages), Oct. 5, 1999.

Training Screen Shots, www.shots.asp (62 pages), Unknown.

"Preventing Sexual Harassment Summary", /www.quicknowledge.com (2 pages), Nov. 12, 1999.

"How to Prevent Sexual Harrassment & Hostile Work Environments", www.stepsbeyond.com (2 pages), Nov. 12, 1999.

"What Supervisors Need to Know About Sexual Harrassnent", http://www.cookit.com (10 pages), Oct. 27, 1999.

"HR Turnkey Training System", www.hrcomply.com (65 pages), Dec. 22, 2000.

* cited by examiner

Christopher Hayes, what should you do?

Read all of the answers and choose the best one by clicking on it.

1. Make a careful record of Harry's complaint. Then terminate Vicky for sexual harassment.
2. Tell Harry to grow up and go back to work.
3. Make a careful record of Harry's complaint and send it along with your report to Bryan Cave's Human Resources.
4. Make a careful record of Harry's complaint. Then, get Vicky's side of the story.

Back to Scenario — 510

Orientation / Classroom / Real World / Quiz / INFO CENTER

METHOD FOR PROVIDING BUSINESS CONDUCT TRAINING

BACKGROUND

The present invention relates to a computer-implemented method for providing business conduct training.

Businesses operating in the United States are subject to various laws governing the conduct of supervisors and employees and may be held liable for the misconduct of these individuals. Such areas of potential liability may include, for example, harassment, discrimination, human relations, ethics, insider trading, handling of confidential information, environmental compliance, and safety. Businesses may avoid or lessen their liability for the misconduct of employees by providing training in such areas of business conduct.

For example, in rulings over the past few years, the United States Supreme Court has established new guidelines for employers who want to limit or even avoid liability in the area of discrimination and harassment. In a recent opinion, issued in 1999, the Court stated that a demonstrated commitment against harassment and discrimination is the best protection against a punitive damage award in discrimination cases and an awareness training program must be part of an employer's commitment.

Traditionally, employers have provided such awareness training through handbooks, seminars and videotapes. However, such traditional training methods have a number of shortcomings. For example, paper-based training materials and videotapes are costly to change because changes usually require a reprint or reproduction. Because of continuous changes in the law, these "static" training materials quickly become out of date. Furthermore, such traditional training materials are usually costly to customize to a particular company's needs. Thus, they often lack effectiveness because they are "generic" and fail to incorporate the company's name, the trainee's name, or the company's policies and procedures. Furthermore, companies are reluctant to customize such traditional training aids because they will quickly become out of date with changes in the law or the company's internal policies and procedures.

The trainee often loses interest and fails to absorb subject matter in videotapes and handbooks because they are not interactive. Such passive training methods also often do not provide an opportunity for the trainee to reinforce knowledge learned through the training course by applying it to issues raised in practical scenarios. Though live training seminars may overcome these disadvantages, they are expensive and time consuming, particularly if the company desires to annually update the training as is often recommended by legal specialists.

Another disadvantage of traditional training methods is that they fail to provide an up to date and convenient resource that the trainee can access after training. Videotapes and seminars are typically not accessible to trainees after the program is completed. Thus, the trainee cannot later consult such training materials to resolve actual problems faced in the workplace or to refresh the his or her knowledge. While paper-based training materials, such as employee handbooks, may be available to the trainee after the training, such materials are often not a useful resource because they are frequently disposed of, misplaced, or out of date.

Traditional training methods also place an administrative burden on the employer by requiring it to also establish and administer a system of recording the employee's participation in the training and comprehension of the training materials presented. To avoid liability for a trainee's misconduct, it is important for the employer to establish a record to prove that the trainee was adequately trained and understood the material.

Previous computer-implemented training methods have failed to effectively overcome these and other shortcomings of traditional training methods. For example, Makipaa U.S. Pat. No. 5,489,213, provides a method of business conduct guidelines education utilizing a computer program. However, the format of this and other similar programs mimics that of traditional training methods. For example, such programs do not provide an effective and up to date resource that can be utilized by the trainee after completion of the course to review materials covered in the course and to handle issues later arising in the workplace. In addition, such programs are generally "one size fits all" products that lack customization features to make the training materials more meaningful and memorable. Prior methods do not contemplate a means for effectively customizing the product by integrating such things as the employee's name, the employer's name, and the employer's policies and procedures within training materials and scenarios to increase the effectiveness and applicability of the training materials. Moreover, such programs lack interactive features to make the training materials interesting and memorable.

The innovative method for providing business conduct training disclosed herein overcomes these and other disadvantages of prior training methods.

SUMMARY

The present invention relates to a computer-implemented method for providing business conduct training, such as harassment/discrimination training.

The trainee inputs an identifier (e.g., a unique password) so that the trainee can be identified. The identifier is preferably associated with a trainee name and employer using a table stored in a database.

A training course including training information relating to business conduct is displayed to the trainee via a user interface, such as a computer screen. The training information displayed is preferably customized to the trainee. The name of the trainee, the name of the employer, and the employer's policies and procedures are incorporated into various screens to make the training materials more relevant and memorable.

As the trainee progresses through the course, the trainee is provided access to an information center module. The information center module provides materials for reinforcing the training information displayed in the training course. The material in the information center module may include information relating to the employer's policies and procedures concerning business conduct; one or more summaries of cases relating to business conduct; one or more tips relating to business conduct; and/or one or more practice quizzes relating to the business conduct. During the training course the trainee is preferably provided access to material in the information center module that is associated with the portion of the training course from which the information center module is accessed. Upon passing the test, the trainee is provided access to all materials in the information center module as a reference following completion of the training. Thus, the information center module provides a useful, up-to-date reference for the trainee to later use to reinforce materials covered in the course or as a guide for addressing issues encountered in the workplace.

A practical scenario is then illustrated to the trainee along training questions and answers requiring application of the training information provided in the training course. Answer choices regarding the scenario are received from the trainee and feedback is transmitted to the trainee relating to the answers selected.

A test is preferably given to the trainee by displaying questions and answer choices requiring application of the training information provided in the training course. The trainee's answer selections are received and evaluated. The program determines whether the trainee passed the test. Feedback is then transmitted to the trainee relating to the test. If a satisfactory score is not received, the trainee is preferably provided with the option of retaking the test and a new test is transmitted, which is made up of a different set of questions and answer choices.

Information relating to the trainee's performance on the test (e.g., the date upon which the trainee passed) is stored in a database. Thus, reports relating to the performance of trainees taking the course may be generated and displayed to authorized training administrators.

DRAWINGS

These and other features, aspects and advantages of the present invention will become more fully apparent from the following detailed description, appended claims, and accompanying drawings where:

FIG. 5B illustrates an example of a user interface for one preferred embodiment of the present invention for displaying questions and answer choices relating to a practical scenario for applying the training materials;

FIG. 8B illustrates an example of a report of training status for selected trainees for one preferred embodiment of the present invention;

For simplicity and clarity of illustration, the drawings and figures illustrate only one general manner of construction of the present invention. Descriptions and details of well-known features and techniques, as are known and will be appreciated by those of ordinary skill in the art, have been omitted.

Furthermore, the terms first, second, third, "then," "thereafter," and the like in the description and in the claims, if any, are used for distinguishing between similar elements and not necessarily for describing a sequential or chronological order. It is further understood that the terms so used are interchangeable under appropriate circumstances and that the preferred embodiments of the invention described herein are claimed and capable of operation in other sequences than described or illustrated herein.

DETAILED DESCRIPTION OF THE INVENTION

The present invention is directed to a computer-implemented method for providing business conduct training to a trainee. The method described herein can be utilized to provide training on any of a wide variety topics where the trainee is required to comply with policies and procedures or to behave in a certain manner. For example, in one embodiment described in detail herein, the method is used to provide harassment and discrimination training. To facilitate an understanding of the principals and features of the present invention, it is explained below with reference to its deployment and implementation in this illustrative embodiment. However, the method can be used to facilitate a wide variety of business conduct training, such as, any type of harassment, discrimination, human relations, ethics, insider trading, handling of confidential information, substance abuse, environmental compliance, safety, etc.

Figure 1:
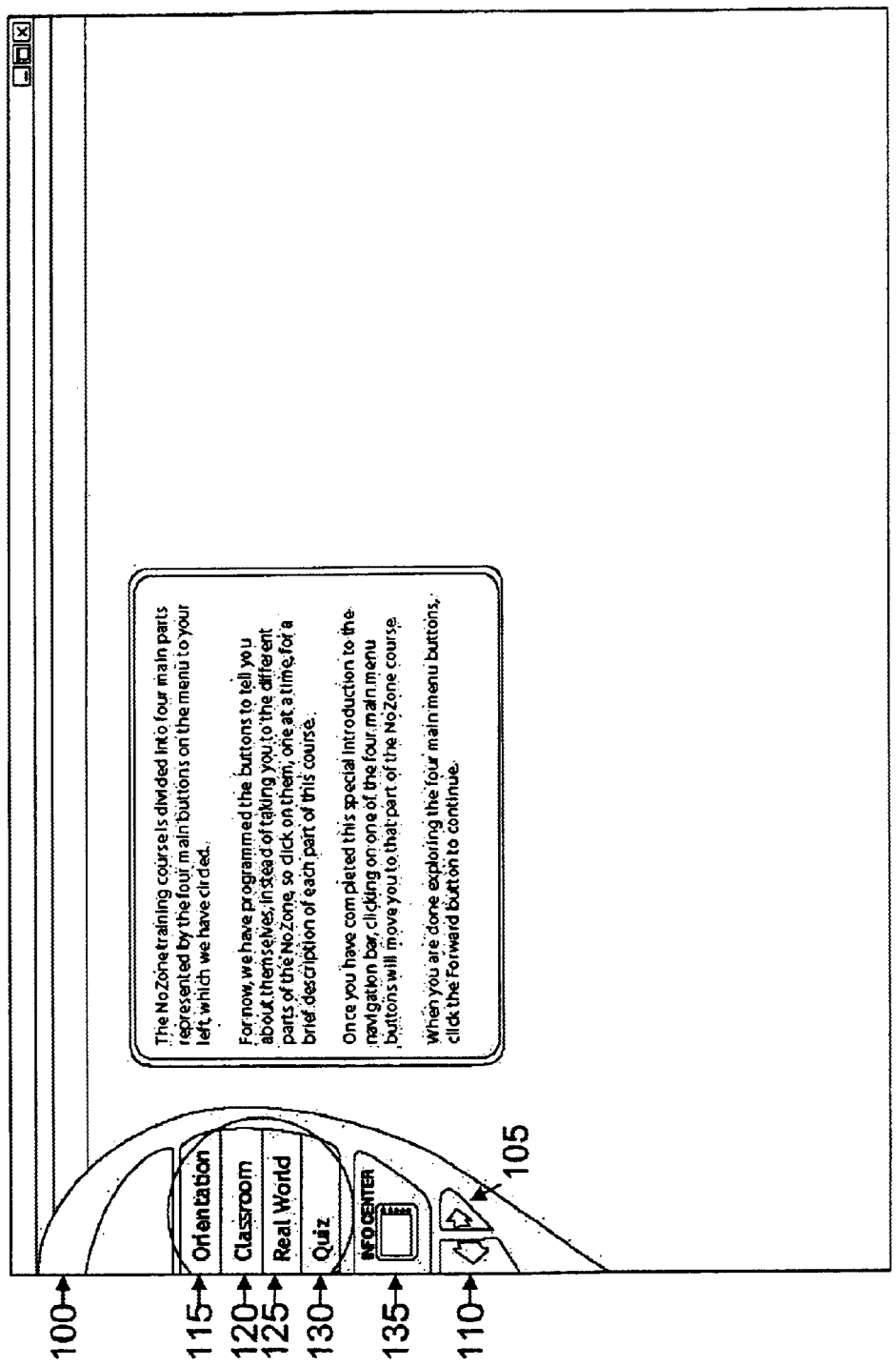
FIG. 1 illustrates an example of a user interface for an exemplary introductory screen for one preferred embodiment of the present invention.

FIG. 1 illustrates an example of a user interface for an opening screen of a computer program for an embodiment of the invention for providing harassment training. The opening screen provides instructions on navigating through the program. The opening screen includes a navigation bar 100. The trainee is provided with a forward button 105 to move ahead from one program screen to the next and a backward button 110 to move back. The training program is divided into various parts represented by four buttons on the navigation bar 100: i) an orientation button 115, ii) a classroom button 120, iii) a real world button 125, and iv) a quiz button 130. These buttons link to the various part of the training program.

The orientation button 115 allows the trainee to access the orientation part of the program, which provides an introduction to the program. The trainee is provided with an explanation of the use of the navigation bar 100 and buttons 115–130 to navigate through the course. Information regarding use of an information center module of the program (discussed below) is also provided to the trainee in the orientation segment.

Figure 2:
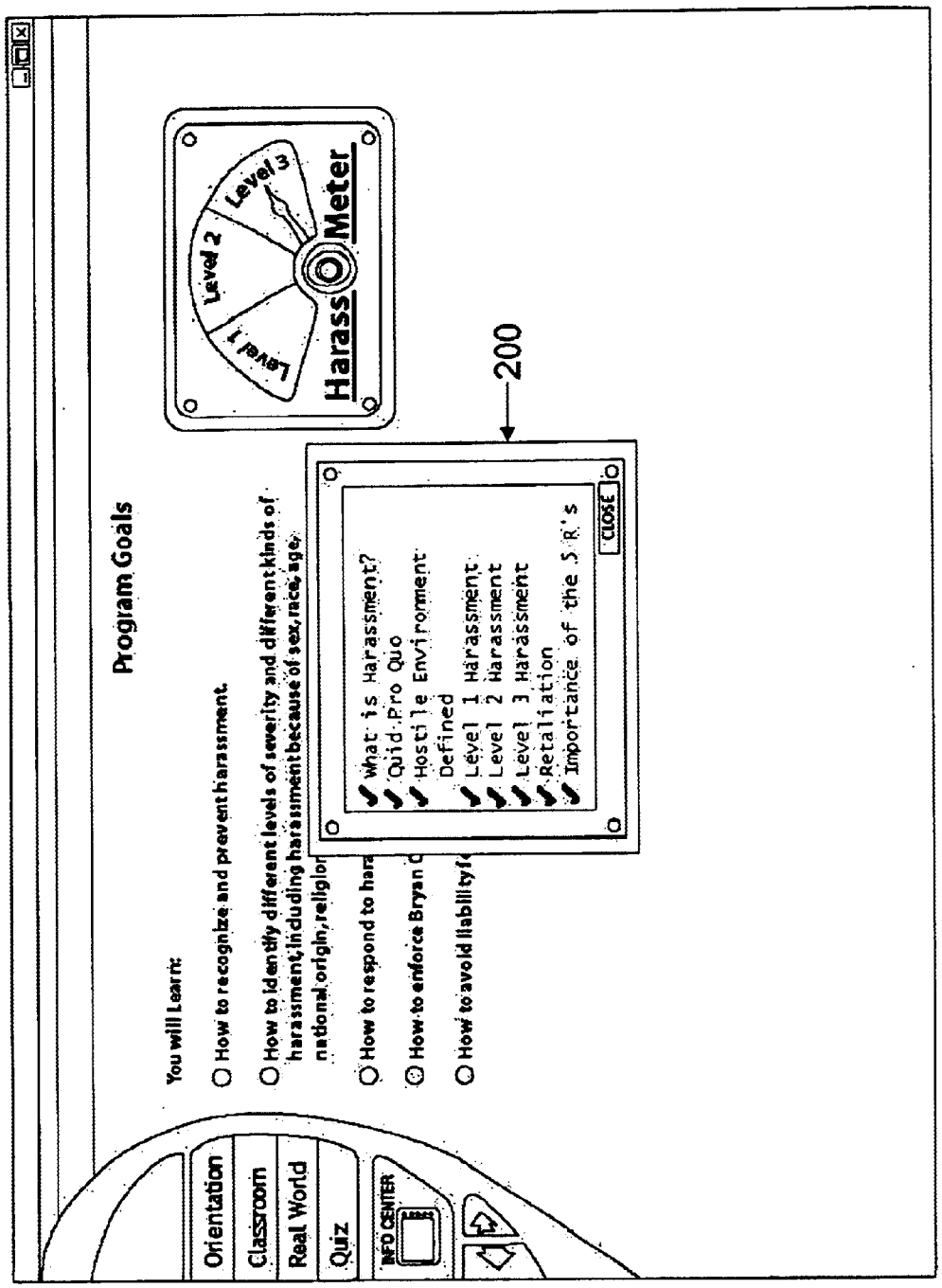
FIG. 2 illustrates an example of a user interface for one preferred embodiment of the present invention for a menu displaying various training topics.

The classroom button 120 allows the trainee to access the main training portion of the program. The classroom portion of the program preferably begins with a message from the employer's top executive stressing the importance of recognizing and appropriately responding to harassment. The trainee is then presented various topics designed to teach the trainee about preventing and handling harassment. FIG. 2 illustrates an example of a menu 200 for navigating to various topics covered in the classroom portion of the course. For example, the following topics may be included: i) What is harassment?; ii) Quid Pro Quo; iii) Hostile Environment; iv) Level 1 Harassment; v) Level 2 Harassment; vi) Level 3 Harassment; and vii) Retaliation.

Figure 3:
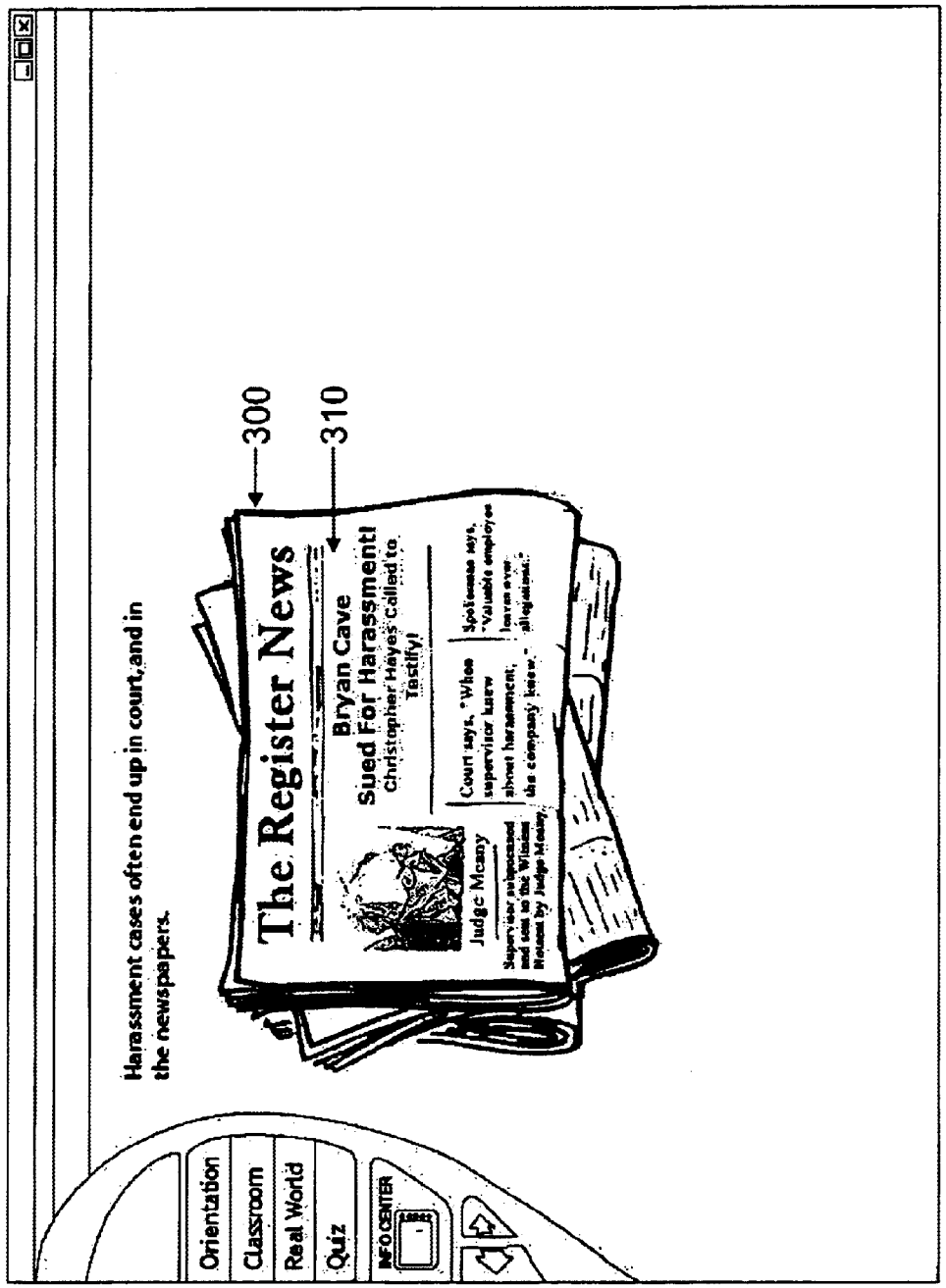
FIG. 3 illustrates an example of a user interface for one preferred embodiment of the present invention for displaying training information.
Figure 4:
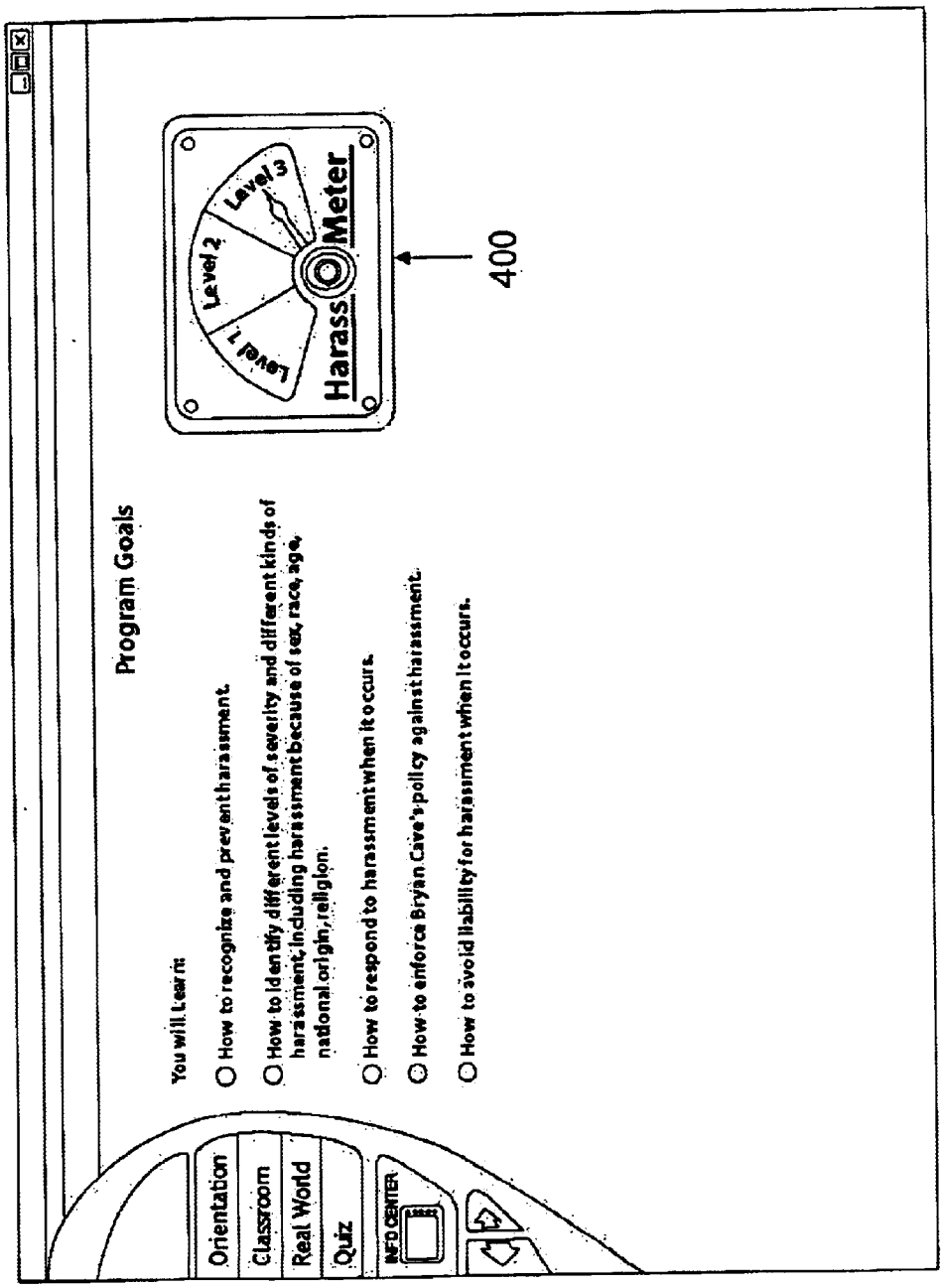
FIG. 4 illustrates an example of a user interface for one preferred embodiment of the present invention for displaying a harassment meter.

The classroom portion of the program (as well as other portions of the course) preferably provide the training material in a humorous, entertaining, or otherwise memorable fashion. For example, the program preferably customizes the materials to the particular trainee to provide a more memorable impact. As illustrated in FIG. 3, the trainee's name 305 and the employer's name 310 are inserted into various fields of a display featuring a simulated newspaper headline 300 in an amusing and memorable way to emphasize an important point. Another innovative feature of the present invention is the use of a visual harassment meter 400 shown in FIG. 4. The harassment meter 400 provides the trainee with a memorable visual indication of the level of harassment (commonly referred to as levels 1, 2, and 3) associated with particular conduct described in the corresponding training material.

Selecting the real world button 125 links the trainee to the real world portion of the program. In this portion of the program, a screen displays a practical harassment scenario to the trainee followed by a series of questions and answer choices. The trainee selects answer choices, which are received and processed by the program. The trainee is transmitted immediate feedback on the selected answers. The real world portion of the course provides the trainee the opportunity to practice what the trainee learned during the classroom portion of the course by applying that information to issues raised by the scenario.

Figure 5A:
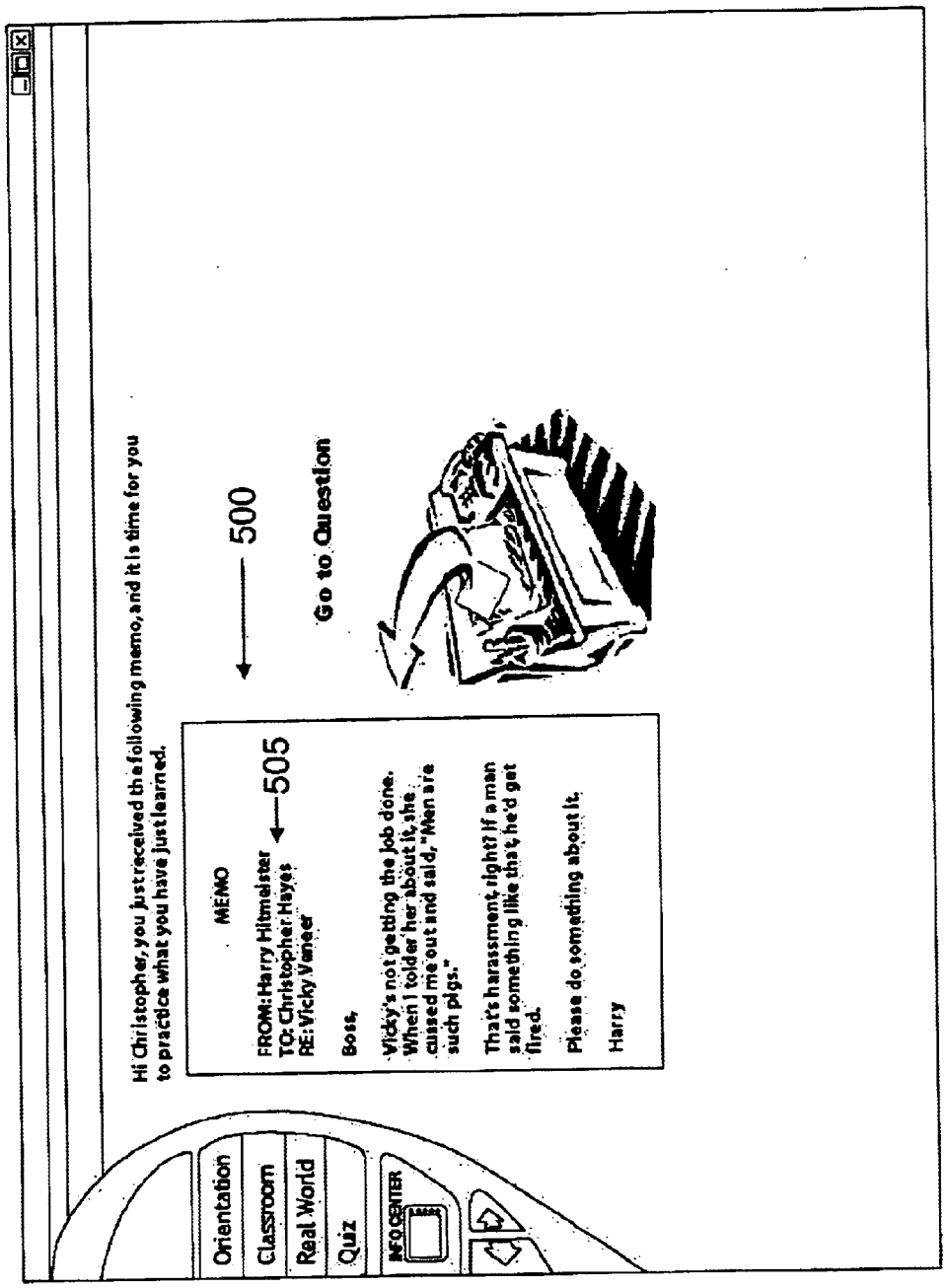
FIG. 5A illustrates an example of a user interface for one preferred embodiment of the present invention for displaying a practical scenario for applying the training materials.
Figure 5C:
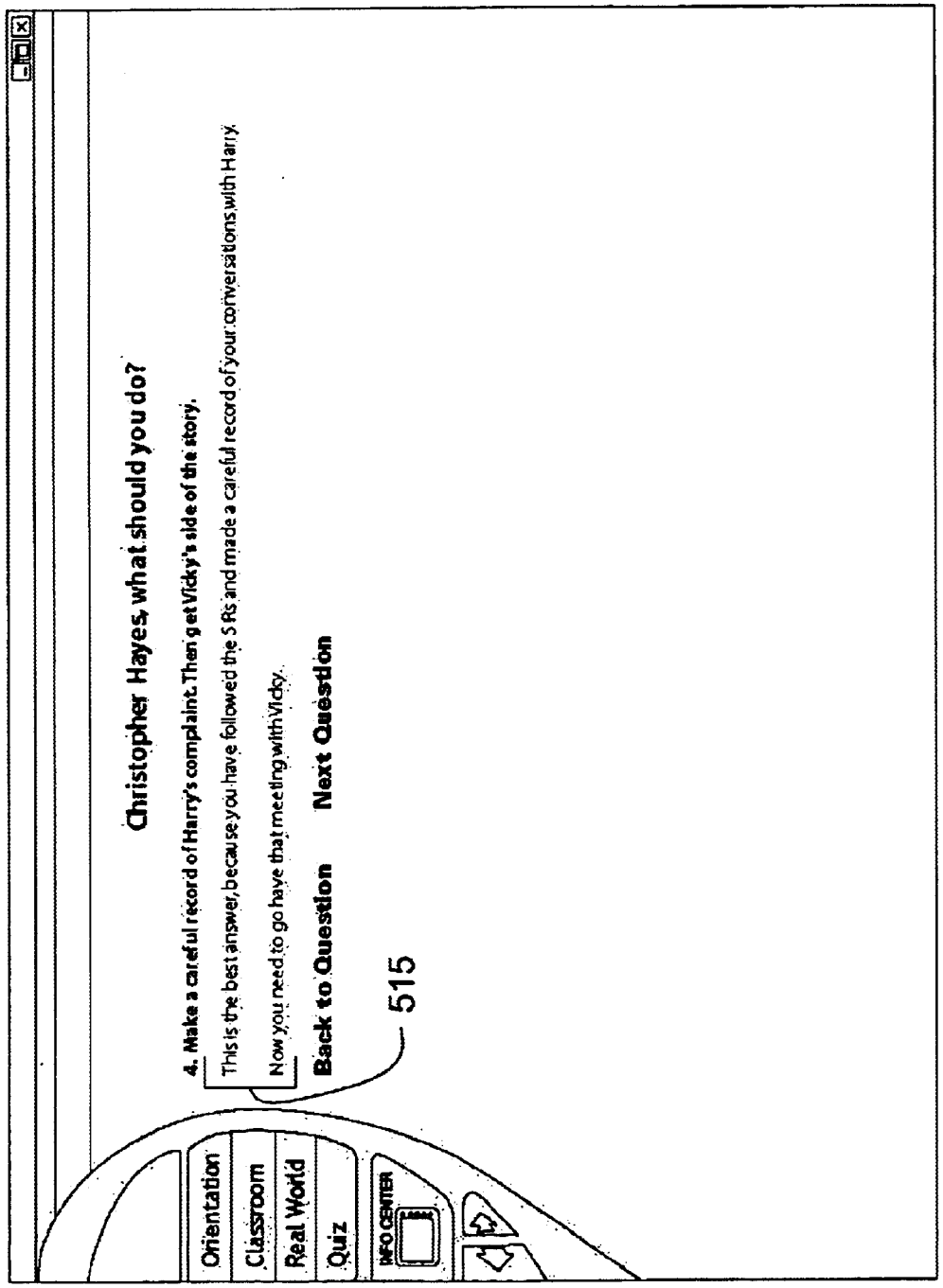
FIG. 5C illustrates an example of a user interface for one preferred embodiment of the present invention for displaying feedback to the trainee relating to a practical scenario for applying the training materials.

FIG. 5A illustrates and example of a practical scenario presented to the trainee in the real world portion of the course. A simulated memorandum 500 is displayed to the trainee. The simulated memorandum 500 (as with other simulations such as newspaper headlines and e-mails) is preferably customized to include the trainee's name 505 in certain fields of the display to make the exercise more meaningful and interesting. As illustrated in FIG. 5B, after viewing the practical scenario, the trainee is then transmitted one or more questions and associated answer choices 510 requiring application of the information covered in the classroom portion of the program. As illustrated in FIG. 5C, the trainee is then transmitted feedback 515 on the answer selected by the trainee.

The quiz button 130 links the trainee to a portion of the program where the trainee is tested on the training material. The trainee is preferably required to complete the classroom section before the trainee can access the test so that it can be shown that the trainee reviewed all of the training materials. In the quiz portion, a series of questions and associated answer choices are transmitted to the trainee. The trainee must correctly answer a predetermined number of questions to pass. The trainee is preferably permitted to continue taking the course and test until a passing score is received. The questions are preferably randomly generated from a group of questions in a database so that the trainee is transmitted a different set of questions each time the test is retaken.

Figure 6A:
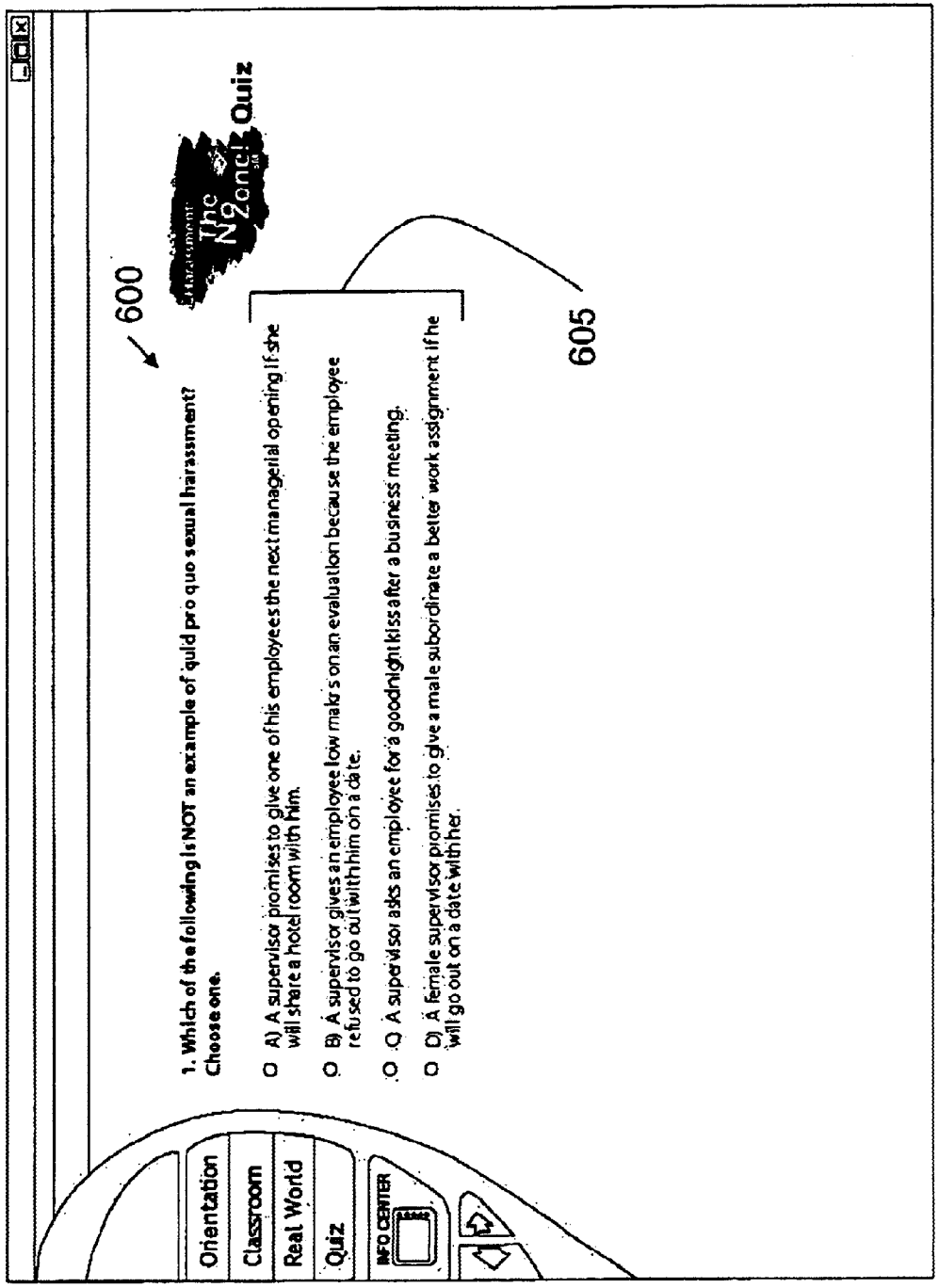
FIG. 6A illustrates an example of a user interface for one preferred embodiment of the present invention for displaying a test question and associated answer choices.
Figure 6B:
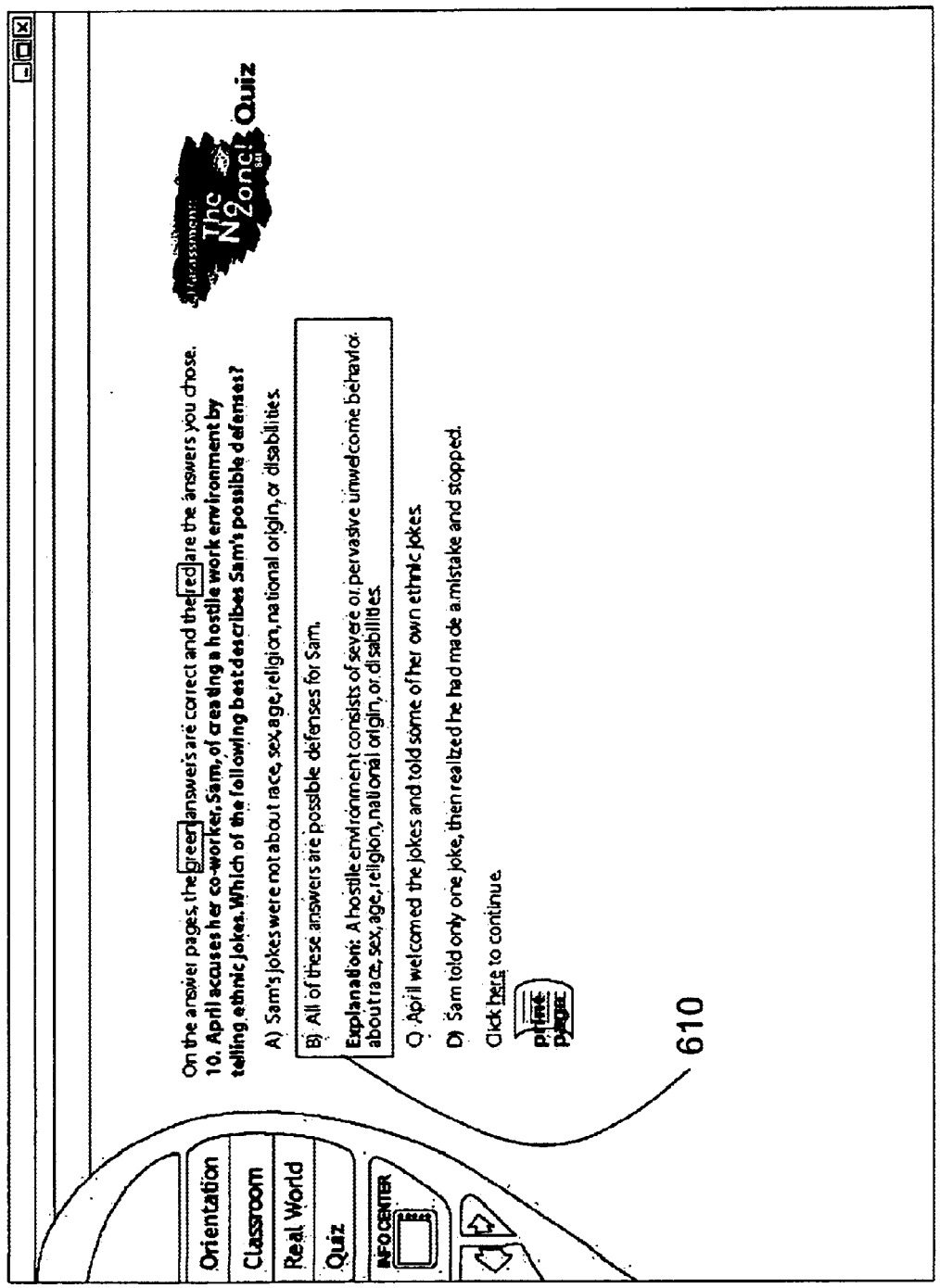
FIG. 6B illustrates an example of a user interface for one preferred embodiment of the present invention for displaying feedback to the trainee regarding test results.

FIG. 6A illustrates an example of the format of the quiz portion of the program. A question 600 is displayed to the trainee along with a series of answer choices 605. As shown in FIG. 6B, upon completion of the test, the trainee is given the correct answers to the questions missed and provided feedback 610 on the answers selected. Upon successful completion of the program, the trainee is preferably transmitted a certificate of completion, which can be printed to provide a written record of course completion.

The program preferably records data relating to the training in a database. For example, the program can record the date the trainee commenced the course and the date the trainee completed the course by passing the quiz portion of the course.

The navigation bar also includes an information center button 135. As the trainee proceeds through the program, an icon will occasionally blink on the information center button 135. This blinking icon alerts the trainee to other information, including special tips, short quizzes, summaries of actual harassment/discrimination cases, and the employer's policies and procedures for dealing with harassment. By selecting the blinking icon on the information center button 135 the trainee may access a separate information center module. An information center module is a separate program module that provides materials for reinforcing information in the training course, such as, the employer's policies and procedures; summaries of actual cases; tips relating to business conduct; or short quizzes to reinforce materials covered in the training course. As the trainee progresses through the course, the trainee is preferably provided access to those materials in the information center module that are applicable to the portion of the classroom training from which the trainee accessed the information center module. As the trainee moves through the classroom portion of the course, the trainee is able to access relevant to portions of the information center module. All materials in the information center module are preferably accessible to the trainee upon passing the test as a resource following completion of the training course.

Figure 7A:
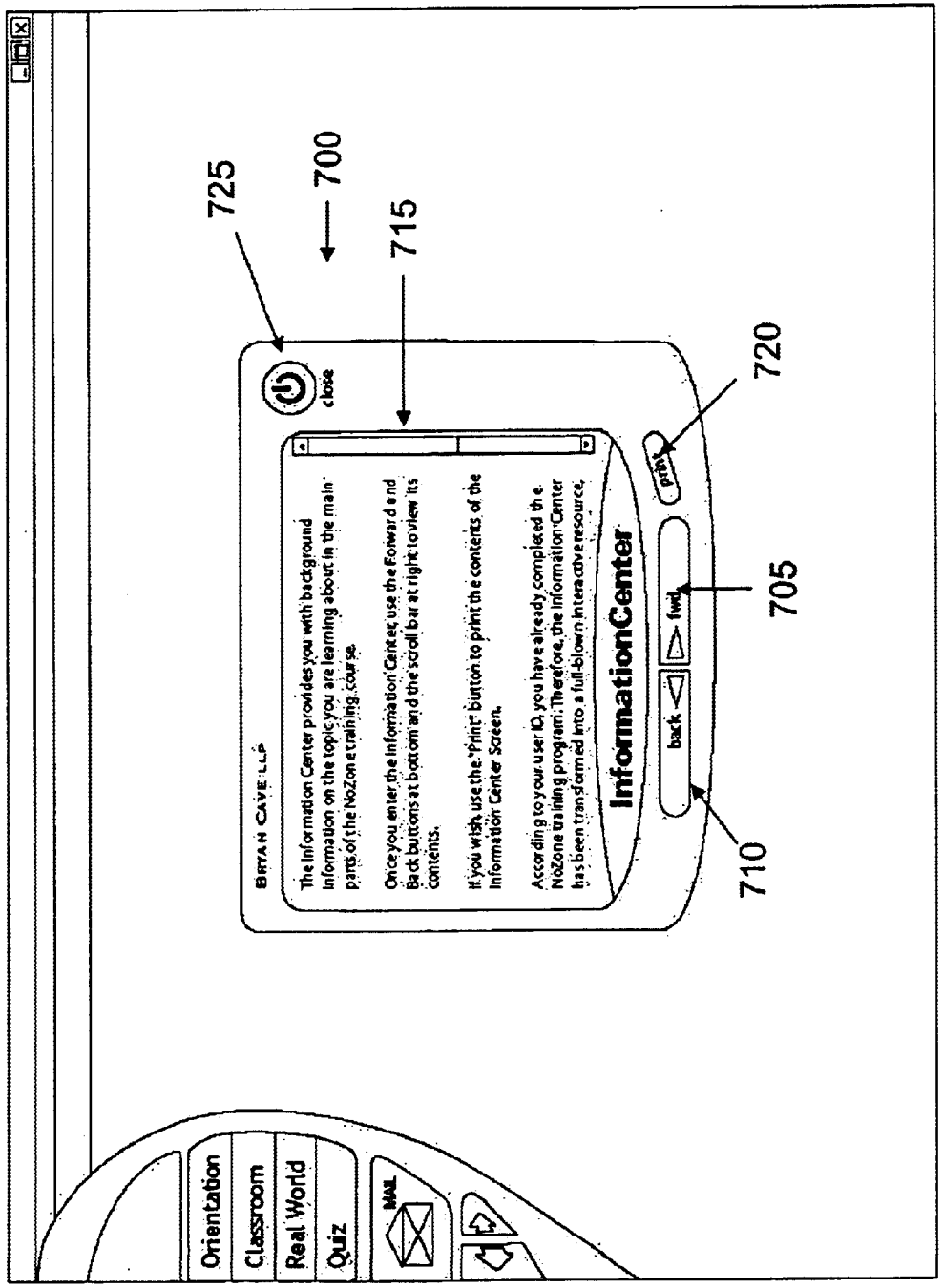
FIG. 7A illustrates an example of a user interface for one preferred embodiment of the present invention for displaying an information center module.

An example of an information center module is illustrated by FIG. 7A, which provides the trainee with materials to reinforce the topics addressed in the corresponding classroom portion of the training program. The information center module 700 includes forward button 705 and backward button 710 and a scroll bar 715, which allow the trainee to view the contents of the information center module 700. The print button 720 allows the trainee to print the contents of the information center screen being displayed. The close button 725 exits the information center module and returns the trainee to the portion of the program from which the information center module was accessed.

After the trainee has successfully completed the training course, the program recognizes the trainee's user identification and transforms the information center module into an interactive resource, which the trainee may consult at any time to refresh knowledge of training topics covered in the course or to help the trainee solve harassment problems encountered in the workplace. After the trainee passes the quiz portion of the course, the program places an information center icon in button 135, which may be used by the trainee to access the information center module from any screen of the program. As a course graduate, the trainee receives access to the entire contents of the information center module by way of an extra set of buttons on the side frame of the information center screen.

Figure 7B:
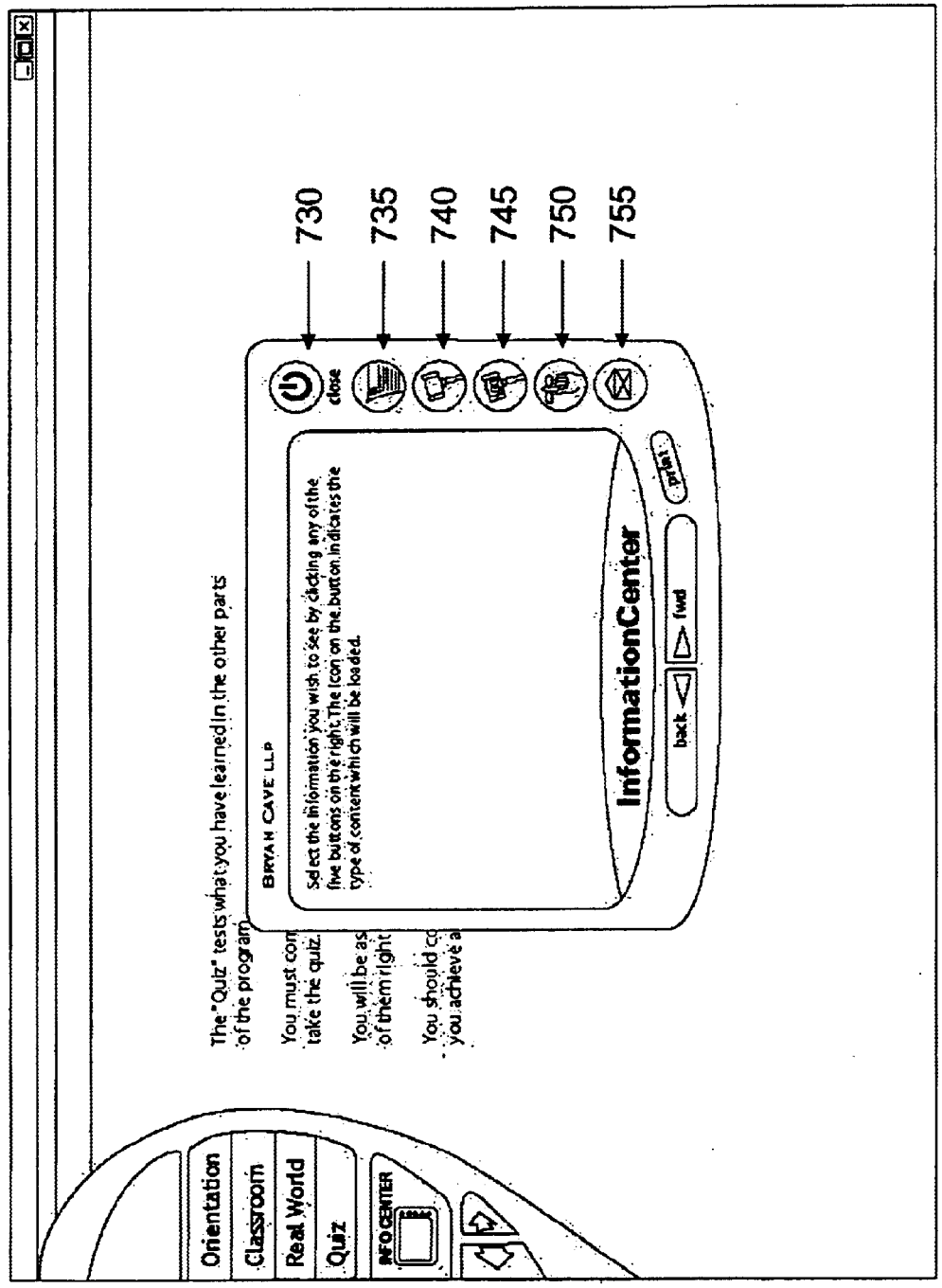
FIG. 7B illustrates an example of a user interface for one preferred embodiment of the present invention for displaying an information center module.

FIG. 7B illustrates a user interface for the information center module as it appears upon completion of the course. Menu 730, having five buttons 735, 740, 745, 750, and 755, is displayed on the right side of the information center screen 700. The trainee may select the type of information that the trainee wishes to see by clicking any of the five buttons 735–755. An icon on each button indicates the type of content which will be loaded. Selecting button 735 allows the trainee to view various resources containing information relating to harassment, such as, the employer's harassment/discrimination policy and summaries of key points communicated in the harassment training. Selecting button 740 allows the trainee to view various summaries of actual cases relating to harassment. Selecting button 745 links the trainee to summaries of interesting or entertaining cases reinforcing points covered in course. Selecting button 750 allows the trainee to view various tips relating to conduct to avoid harassment. Selecting button 755 provides the trainee with links to various simulated e-mail messages received by the trainee during the course, which present realistic scenarios and questions requiring the trainee to test knowledge acquired during the course.

Trainees are preferably identified using a table, which includes an identifier (e.g., a password) linked to data relating to each trainee. The table preferably includes the trainee's assigned password, name, e-mail address, and (if desired) other identification information such as a social security number. The program administrator is preferably provided with a list of trainees, e-mail addresses and other information, which is entered into a database stored in memory. Each trainee is then assigned a password that uniquely identifies the trainee. The unique passwords are then e-mailed or otherwise distributed to the trainees. Each trainee enters the trainee's unique password to access the training program. By using a unique identifier to identify each trainee, the program can be customized to the particular trainee (e.g., by incorporating the trainee's and employer's name into the training materials). Identification of the trainee also allows the program to record the particular trainee's performance in a database.

Figure 8A:
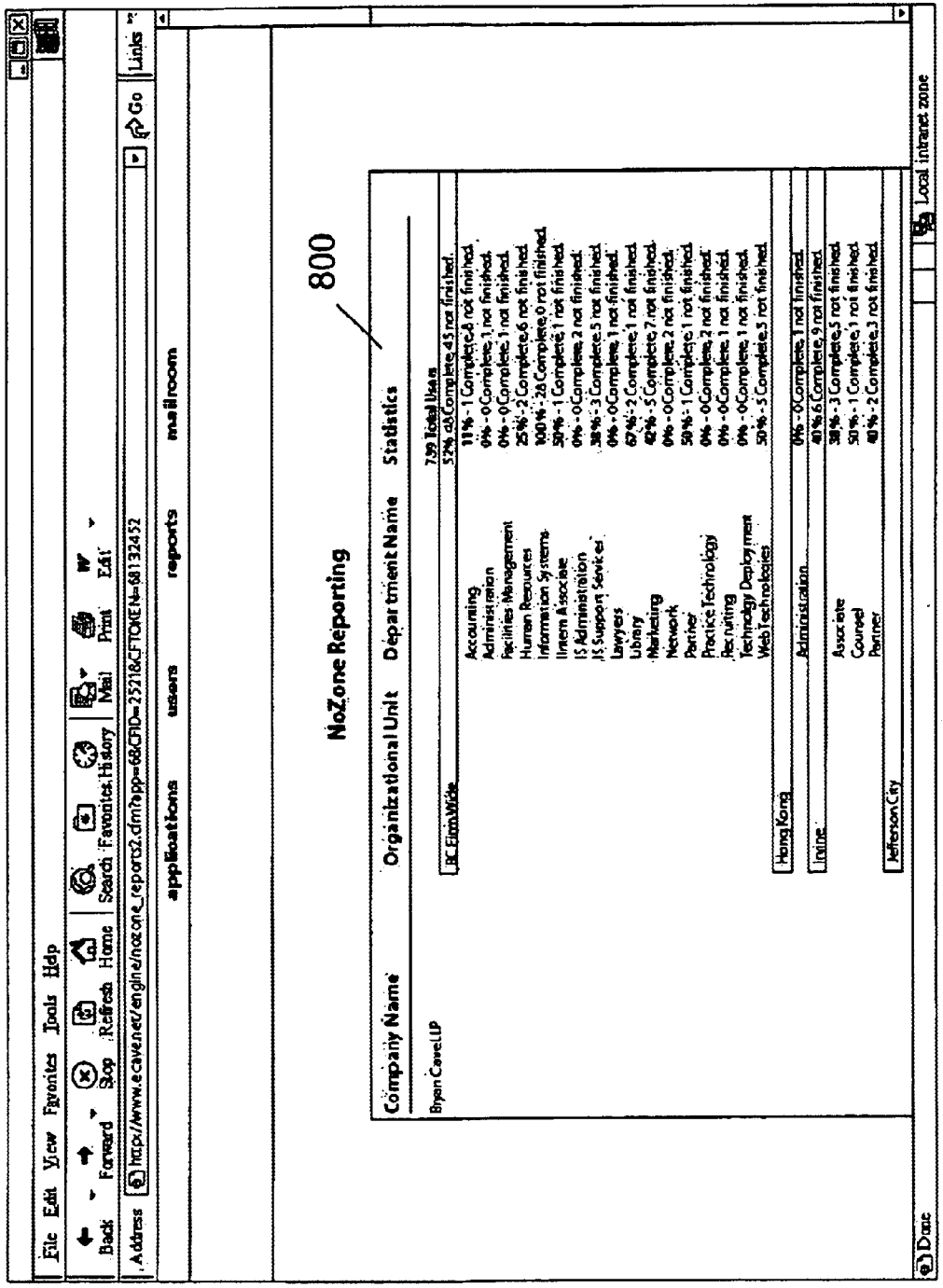
FIG. 8A illustrates an example of a report of company-wide training status for one preferred embodiment of the present invention.
Figure 8B:
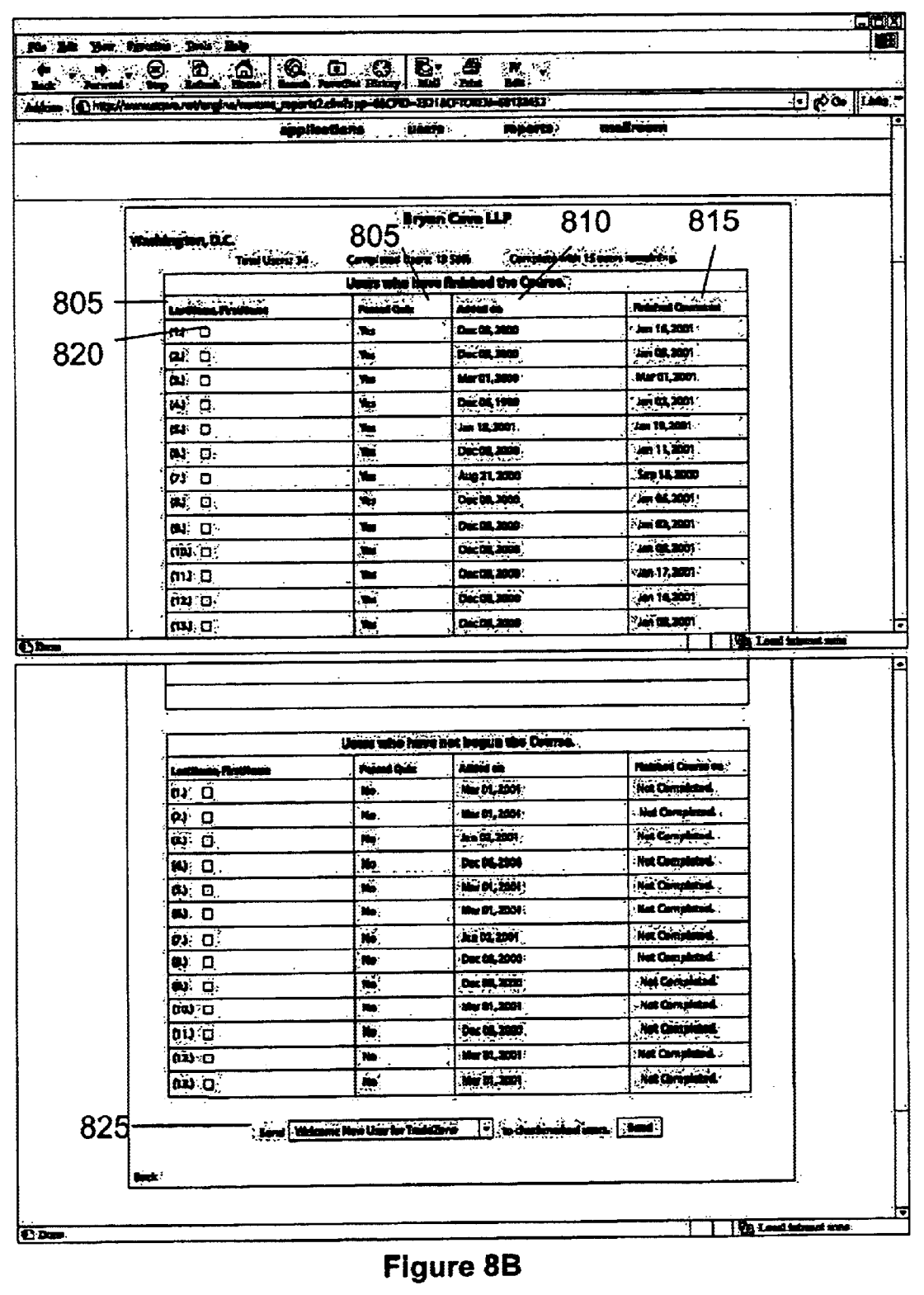
Figure 8C:
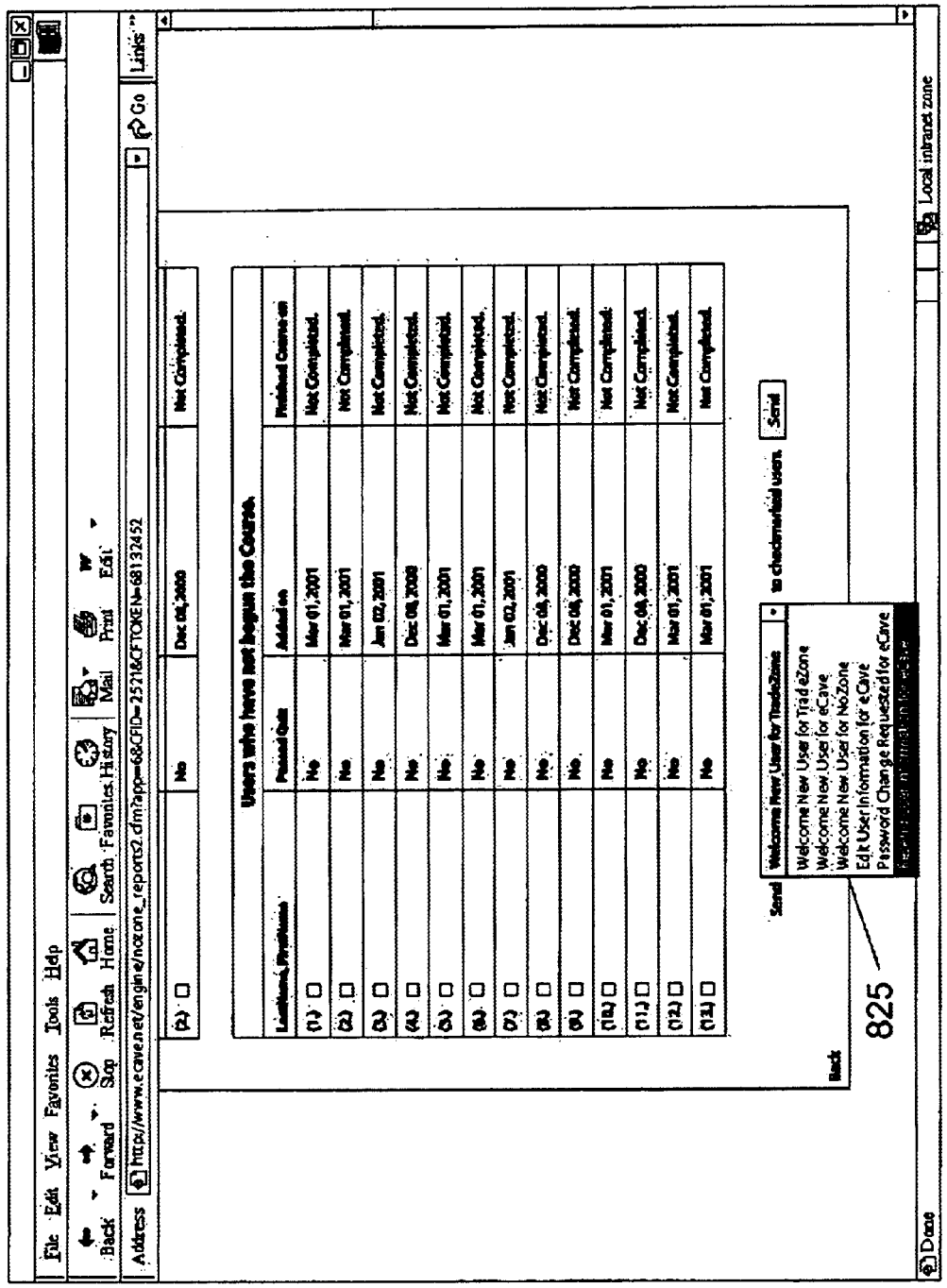
FIG. 8C illustrates an example of an e-mail function of a report for one preferred embodiment of the present invention.

The program also produces various reports relating to the status of the training. The reports are preferably available on-line only to authorized administrative personnel, who are provided access to view reporting data. FIG. 8A illustrates an example of a report summarizing the status of the training for an entire company. The report provides statistics 800 regarding the percentage of course completion organized by company name, organizational unit, and department name. FIG. 8B illustrates an example of a report summarizing statistics organized by individual user. The report provides the user name 805, an indication of whether the trainee has passed the test 805, the date the trainee was added to the course list 810, and the date the course was completed 815. By selecting a box 820 next the each persons name, trainees may be selected to receive an e-mail message relating to the training. As shown in FIG. 8C, e-mail messages may be sent using menu 825, which allows an authorized administrator to send a variety of standard messages to trainees.

The method of the present invention is preferably implemented, in one embodiment, via a web-based system (Internet or intranet). The software application is preferably created using any of a variety of web application development software packages and run using a compatible server program (e.g., COLD FUSION® application development and server software by Allaire, L.L.C.). The software application may be stored on any computer-readable medium (e.g., computer disks, CD ROM or any other memory device).

Figure 9:
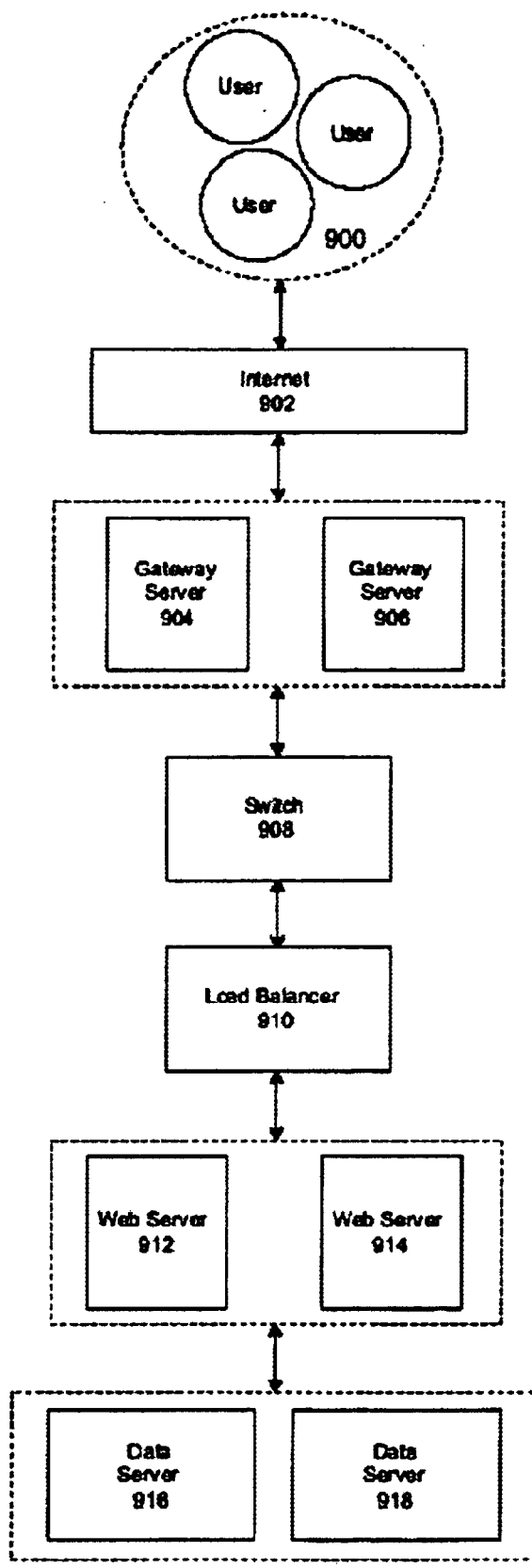
FIG. 9 is a schematic for one preferred embodiment of the present invention illustrating a typical computer hardware configuration for implementing the method of the present invention.

FIG. 9 is a schematic illustrating a typical hardware configuration for running a software application embodying the method of the present invention. One or more users 900 establish connections with the Internet 902. Through standard Internet communication protocols, a request for the application is acknowledged by the network. Default gateway servers 904 and 906 routes the user's request to the host network. After entering the host network, switch 908 directs the request to the appropriate network segment. The request is received by load balancer 910, which ensures even performance and priority of each request by directing the request to one of two mirrored web servers 912 and 914 depending upon the current load on each web server. Web servers 912 and 914 are identical servers that both deliver the host applications to allow a high volume of requests and to provide a backup in the event of hardware failure. Web servers 912 and 914 communicate with database servers 916 and 918 to process the request and deliver a fully-functional application to the user.

Although the invention has been described with reference to specific embodiments, it will be understood by those skilled in the art that various changes may be made without departing from the spirit or scope of the invention. For instance, the numerous details set forth herein such as, for example, details relating to the harassment embodiment of the present invention are provided to facilitate the understanding of the invention and are not provided to limit the scope of the invention. Accordingly, the disclosure of embodiments of the invention is intended to be illustrative of the scope of the invention and is not intended to be limiting. It is intended that the scope of the invention shall be limited only to the extent required by the appended claims.

I claim:

1. A computer-implement method for providing business conduct training, the method comprising the steps of:

receiving an identifier for identifying a trainee;

displaying a training course comprising training information relating to business conduct to die trainee;

providing access to an information center module separate from the training course, the information center module comprising materials for reinforcing training information displayed in the training course, wherein, as the trainee progresses through the training course, the trainee is permitted to temporarily exit the training course in order to access the information center module at a plurality of access points, at each access point the trainee is provided access to material in the information center module associated with a portion of the training course from which the information center module was accessed, and, after temporarily accessing the information center module, the trainee is permitted to return to the portion of the training course from which the information center module was accessed;

providing a rest to the trainee by displaying a plurality of test questions and test answer choices requiring application of the training information provided in the training course;

receiving one or more test answer selections from the trainee;

evaluating the test answer selections to determine a rest score;

determining whether the test score exceeds a minimum threshold;

transmitting feedback to the trainee relating to the test score;

if said test score exceeds a minimum threshold, displaying an icon to said trainee which provides access to all materials in the information center module.

2. The method of claim 1, further comprising die steps of:
providing a quiz to the trainee by displaying a plurality of quiz question and quiz answer choices requiring application of the training information provided in the training course;
receiving one or more quiz answer selections from the trainee; and
transmitting feedback so she trainee relating to the quiz answer selections.

3. The method of claim 1, further comprising the steps of providing the trainee with the option of retaking the test if the test score does not exceed the minimum threshold and transmitting a new rest comprising a different set of test questions and test answer choices.

4. The method of claim 1, further comprising the step of recording information relating to the trainee's performance on the rest in a database.

5. The method of claim 4, further comprising the step of generating and displaying reports relating to the performance of one or more trainees on the test.

6. The method of claim 1, wherein the materials in the formation center module comprise:
information relating to policies and procedures of an employer concerning business conduct;
one or more summaries of cases relating so business conduct;
one or more tips relating to business conduct; and
one or more practice quizzes relating to business conduct.

7. The method of claim 1, further comprising the steps of:
associating the identifier with a trainee name using a trainee name table; and
incorporating the trainee name into the information displayed to the trainee.

8. The method of claim 1, further comprising the step of incorporating the policies and procedures of an employer into the training information displayed to the trainee.

9. The method of claim 1, wherein the business conduct training relates to harassment training, and wherein the step of displaying a training course further comprises the step of visually displaying a meter designating one of a plurality of levels of harassment associated with certain conduct.

10. A computer-implemented method for providing harassment or discrimination training to a trainee, the method comprising:
receiving an identifier for identifying the trainee, associating the identifier with a trainee name using a trainee name table;
displaying a training course comprising training information relating to business conduct to the trainee, wherein the trainee's name, policies and procedures of an employer, and a visual meter designating one of a plurality levels of harassment or discrimination associated with certain conduct are incorporated into die information displayed to the trainee;
providing access to an information center module separate from the training course, the information center module comprising materials for reinforcing training information associated with a portion of the training course from which the information center module is accessed, wherein, as the trainee progresses through the training course, the trainee is permitted to temporarily exit the training course in order to access the information center module at a plurality of access points, at each access point the trainee is provided access to material in the information center module associated with the portion of the training course from which the information center module was accessed, and, after temporarily accessing the information center module, the trainee is permitted to return to the portion of the training course from which the information center module was accessed, and wherein the materials for reinforcing training information displayed in the training course comprise:
information relating to policies and procedures of an employer concerning business conduct;
one or worn summaries of cases relating to business conduct;
one or more tip relating to business conduct; and
one or more practice quizzes relating to business conduct;
providing a quiz to the trainee by displaying a plurality of quiz questions and quiz answer choices requiring application of the training information provided in the training course;
receiving one or more quiz answer selections from the trainee;
transmitting feedback to the trainee relating to the quiz answer selections;
providing a test to the trainee by displaying a plurality of rest questions and test answer choices requiting application of the training information provided in the training course;
receiving one or more test answer selections from the trainee;
evaluating the test answer selections to determine a test score;
determining whether the test score exceeds a minimum threshold;
transmission feedback to the trainee relating to the test score;
providing the trainee with the option of retaking the test if the test score does not exceed the minimum threshold and transmitting a new test comprising a different set of test questions and test answer choices;
recording information relating to the trainee's performance on the test in a database;
generating and displaying reports relating to the performance of one or more trainees on the test; and
if said test score exceeds said minimum threshold displaying an icon to said trainee which provides access to all materials in the information center module.

11. A computer readable medium storing computer instructions for performing a method of providing business conduct training to a trainee, the method comprising:
receiving art identifier for identifying a trainee;
displaying a training course comprising training information relating to business conduct to the trainee;
providing access to an information center module separate from the training course, the information center module comprising materials for reinforcing training information displayed in the training course wherein, as the trainee progresses through the training course, the trainee is permitted temporarily exit the training course in order to access the information center module at a plurality of access points, at each access point the trainee it provided access to material in the information center module associated with a portion of the training course from which the information center module was accessed, and, after temporarily accessing the information center module, the trainee is permitted to return to the portion of the training course from which the information center module was accessed;
providing a test to the trainee by displaying a plurality of test questions and test answer choices requiring application of the training information provided in the training course;

receiving one or more test answer selections from the trainee;

evaluating the test answer selections to determine a test score;

determining whether the test score exceeds a minimum threshold;

transmitting feedback to the trainee relating to the test score;

if said test score exceeds said minimum threshold displaying an icon to said trainee which provides access to all materials in the information center module.

12. The computer readable medium of claim 11, further comprising the steps of:

providing a quiz so the trainee by displaying a plurality of quiz questions and quiz answer choices requiring application of she training information provided in the training course;

receiving one or more quiz answer selections from the trainee; and transmitting feedback to the trainee relating to the quiz answer selections.

13. The computer readable medium of claim 11, further comprising the steps of providing the trainee with the option of retaking the test if the test score does not exceed the minimum threshold and transmitting a new test comprising a different set of test questions and teas answer choices.

14. The computer readable medium of claim 11, further comprising the step of exceeding information relating to the trainees performance on the test in a database.

15. The computer readable medium of claim 14, further comprising the step of generating and displaying reports relating to the performance of one or more trainees on the test.

16. The computer readable medium of claim 11, wherein the materials in the information center module comprise:

information relating to policies and procedures of an employer concerning business conduct;

one or more summaries of cases relating to business conduct;

one or more tips relating to business conduct; and one or more practice quizzes relating so business conduct.

17. The computer readable medium of claim 11, further comprising the steps of:

associating the identifier with a trainee name using a trainee name table; and incorporating the trainee name into the information displayed to the trainee.

18. The computer readable medium of claim 11, further comprising the step of incorporating the policies and procedures of an employer into the training information displayed to the trainee.

19. The computer readable medium of claim 11, wherein the business conduct training relaxes to harassment training, and wherein the step of displaying a training course further comprises the step of visually displaying a meter designating one of a plurality of levels of harassment associated with certain conduct.

20. A computer readable medium storing instructions for performing a method of providing harassment or discrimination training to a trainee, the method comprising receiving an identifier for identifying the trainee, associating the identifier with a trainee name using a trainee name table;

displaying a training course comprising training information relating to business conduct to the trainee, wherein the trainee's name, policies and procedures of an employer, and a visual meter designating one of a plurality of levels of harassment or discriminating associated with certain conducts are incorporated into the information displayed to the trainee;

providing access to an information center module separate from the training course, the information center module comprising materials for reinforcing training information associated with a portion of the training course from which the information center module is accessed, wherein, as the trainee progress through the training course, the trainee is permitted to temporarily exit the training course in order to access the information center module at a plurality of access points, at each access point the trainee is provided access to material in the information center module associated with the portion of the training course from which the information center module was accessed, and, after temporarily accessing the information center module, the trainee is permitted to return to the portion of the training course from which the information center module was accessed, and wherein die materials for reinforcing training information displayed in the training course comprise:

information relating to policies and procedures of an employer concerning business conduct;

one or more summaries of cases relating to business conduct;

one or more tips relating to business conduct and one or more practice quizzes relating to business conduct;

providing a quiz to the trainee by displaying a plurality of quiz questions and quiz answer choices requiring application of the training information provided in the training course;

receiving one or more quiz answer selections from the trainee;

transmitting feedback to the trainee relating to the quiz answer selections;

providing a test to the trainee by displaying a plurality of ten questions and rest answer choices requiring application of the training information provided in the training course;

receiving one or more test answer selections from the trainee;

evaluating the test answer selections to determine a rest score;

determining whether the test score exceeds a minimum threshold;

transmitting feedback to the trainee relating to the test score;

providing the trainee with the option of retaking the test if the test score does not exceed the minimum threshold and transmitting a new test comprising a different set of test questions and test answer choices;

recording information relating to the trainee's performance on the test in a database;

generating and displaying relating to the performance of one or more trainees on the test; and if said test score exceeds said minimum threshold displaying an icon to said trainee which provides access to all materials in the information center module.

* * * * *